United States Patent
Andrews et al.

(10) Patent No.: US 10,063,593 B2
(45) Date of Patent: Aug. 28, 2018

(54) PROPAGATING FRAUD AWARENESS TO HOSTED APPLICATIONS

(71) Applicant: International Business Machines Corporation, Armonk, NY (US)

(72) Inventors: Scott M. Andrews, Carrara (AU); Timothy J. Ashton, Sunnybank Hills (AU); Leigh Doddy, Sunbury (AU); Christopher J. Hockings, Burleigh Waters (AU); Trevor S. Norvill, Parkwood (AU)

(73) Assignee: International Business Machines Corporation, Armonk, NY (US)

( * ) Notice: Subject to any disclaimer, the term of this patent is extended or adjusted under 35 U.S.C. 154(b) by 220 days.

(21) Appl. No.: 14/982,405

(22) Filed: Dec. 29, 2015

(65) Prior Publication Data
US 2017/0187751 A1 Jun. 29, 2017

(51) Int. Cl.
*H04L 29/00* (2006.01)
*H04L 29/06* (2006.01)
*H04L 29/08* (2006.01)

(52) U.S. Cl.
CPC ............. *H04L 63/20* (2013.01); *H04L 63/08* (2013.01); *H04L 63/10* (2013.01); *H04L 63/102* (2013.01); *H04L 67/025* (2013.01); *H04L 67/16* (2013.01)

(58) Field of Classification Search
None
See application file for complete search history.

(56) References Cited

U.S. PATENT DOCUMENTS

| | | | |
|---|---|---|---|
| 7,234,157 B2 | 6/2007 | Childs et al. | |
| 7,409,704 B1 * | 8/2008 | Charas | H04L 12/2858 709/223 |
| 7,908,645 B2 | 3/2011 | Varghese et al. | |
| 8,276,202 B1 | 9/2012 | Dubrovsky et al. | |
| 8,739,278 B2 | 5/2014 | Varghese | |
| 8,869,259 B1 | 10/2014 | Udupa et al. | |

(Continued)

OTHER PUBLICATIONS

James, Manju, "Aggregating cache data from OCEP in CQL", Nov. 29, 2011, <https://blogs.oracle.com/CEP/entry/aggregating_cache_data_from_ocep>, 4 pages.

*Primary Examiner* — Madhuri R Herzog
(74) *Attorney, Agent, or Firm* — David B. Woycechowsky

(57) ABSTRACT

A policy enforcement point includes fraud prevention information associated with devices and/or users which is collected from: (i) many cloud fraud services located in the cloud; and/or (ii) authorization processing of users and/or devices. The policy enforcement point is consulted when a user/device undergoes authorization processing for a transaction with an application (for example, an application that serves protected content such as financial records, email, etc.). Fraud prevention information is added to session data, associated with the attempted authorization to the application, for the user/device as the user/device proceeds its attempted authorization to the application. In some cases, the authorization to the application may be refused based on the data added to the session data by the policy enforcement point or the policy enforcement point will propagate fraud prevention information to the application to make the decision.

9 Claims, 6 Drawing Sheets

(56) References Cited

U.S. PATENT DOCUMENTS

| | | | |
|---|---|---|---|
| 2013/0144888 A1* | 6/2013 | Faith | G06F 17/30696 |
| | | | 707/748 |
| 2014/0304148 A1* | 10/2014 | Flanagan | G06Q 20/4016 |
| | | | 705/39 |
| 2015/0213449 A1* | 7/2015 | Morrison | G06Q 20/4016 |
| | | | 705/44 |
| 2015/0269383 A1* | 9/2015 | Lang | G06F 21/57 |
| | | | 726/1 |

* cited by examiner

PROPAGATING FRAUD AWARENESS TO HOSTED APPLICATIONS

BACKGROUND

The present invention relates generally to the field of online security and more particularly to convergence of fraud detection and prevention services in perimeter devices.

Fraud is a growing problem for online businesses operating, for example, in the finance industry. Conventional solutions aim to address financial, and other types, of fraud by providing multiple solutions that operate independently of each other.

SUMMARY

According to one aspect of the present invention, a method, computer program product and/or system perform the following operations (not necessarily in the following order): (i) collecting, in a fraud related data cache of a policy enforcement point system through a communication network and from a plurality of cloud fraud services, machine readable fraud related data; (ii) intercepting, by the policy enforcement point system, a response being transmitted over a communications network from a cloud fraud service to a client device, with the response being responsive to a request generated by a browser script in a browser of the client device; (iii) determining, by the policy enforcement point system, an authorization related data set, based, at least in part, on the machine readable fraud related data, with the authorization related data set relating to a fraud risk of at least one of the following: the client device, or a user of the client device; (iv) modifying, by the policy enforcement point system and to generate a modified response, session data included in the intercepted response to filter out sensitive data so that any sensitive data that is present in the intercepted response will not be present in the modified response; and (v) sending, by the policy enforcement point system through the communication network, the modified response to the client device.

DETAILED DESCRIPTION

Figure 1A:
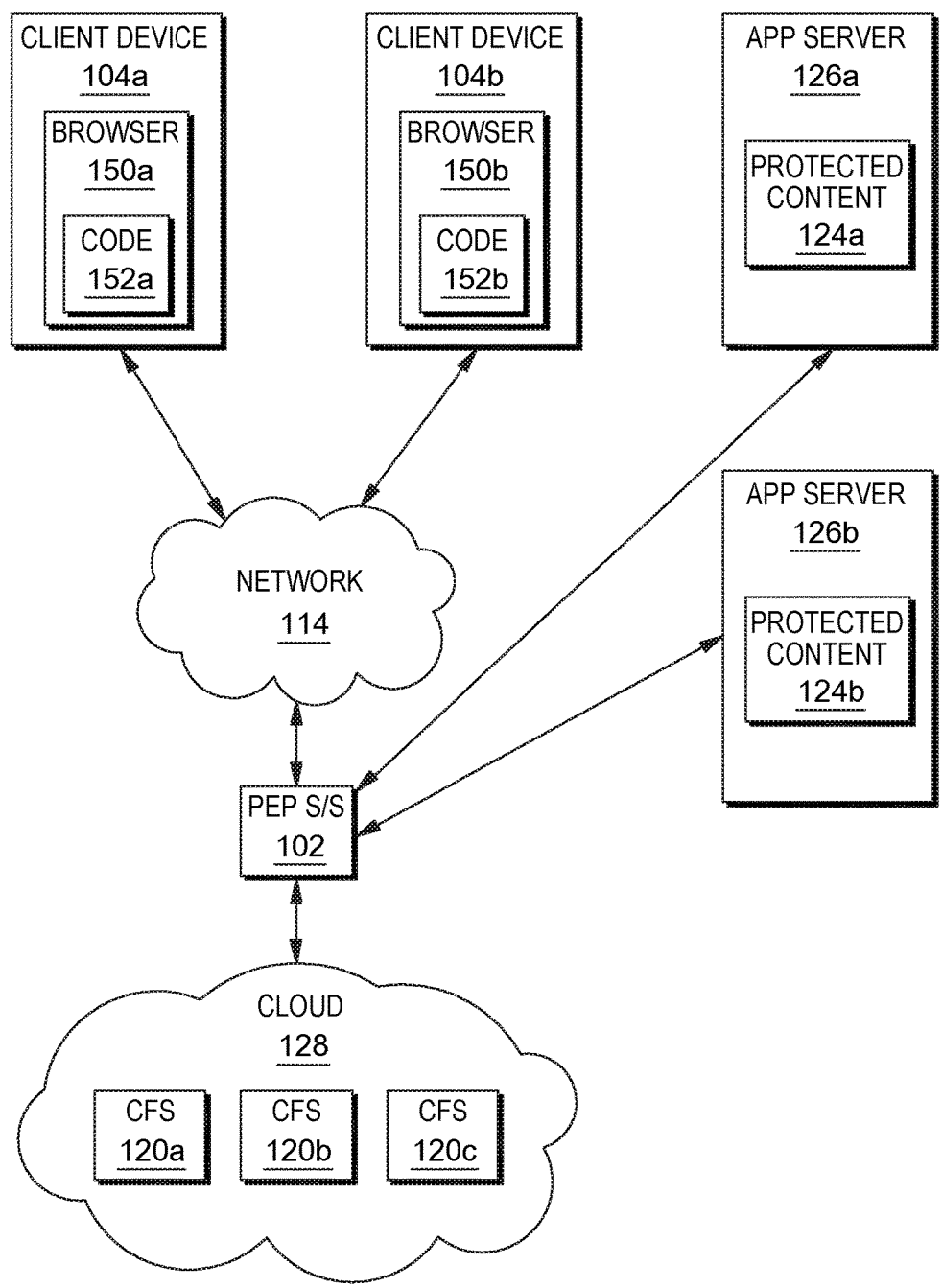
FIG. 1A is a block diagram of a first embodiment of a system according to the present invention.

In some embodiments of the present invention, a policy enforcement point includes fraud prevention information associated with devices and/or users which is collected from: (i) many cloud fraud services located in the cloud; and/or (ii) authorization processing of users and/or devices. The policy enforcement point is consulted when a user/device undergoes authorization processing with respect to an application (for example, an application that serves protected content such as financial records, email, etc.). In some embodiments, fraud prevention information is added to session data, associated with the attempted authorization to the application, for the user/device as the user/device proceeds its attempted authorization to the application. In some embodiments, the policy enforcement point may: (i) poll the cloud fraud services to maintain currency for fraud session data; and/or (ii) propagate new fraud prevention information to the many cloud fraud services present in the cloud. Some embodiments of the present disclosure include one, or more, of the following features, characteristics and/or advantages: (i) a user session with fraud analysis results of a device so that authorization policies may be applied at a gateway independent of an application tier and independent of the device; (ii) determination, on a case by case basis, the trustworthiness of a device being presented; (iii) extension of conventional user-based authorization solutions to include detection of fraud within the context of a user's requested operation; (iv) convergence, at a gateway, of the presence of malware on a device with user authorization and victim identification, to provide a single enforcement point for making access control decisions; and/or (v) a trusted channel to deliver device fraud metadata and user related fraud metadata to the application.

This Detailed Description section is divided into the following sub-sections: (i) The Hardware and Software Environment; (ii) Example Embodiment; (iii) Further Comments and/or Embodiments; and (iv) Definitions.

I. The Hardware and Software Environment

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1B:
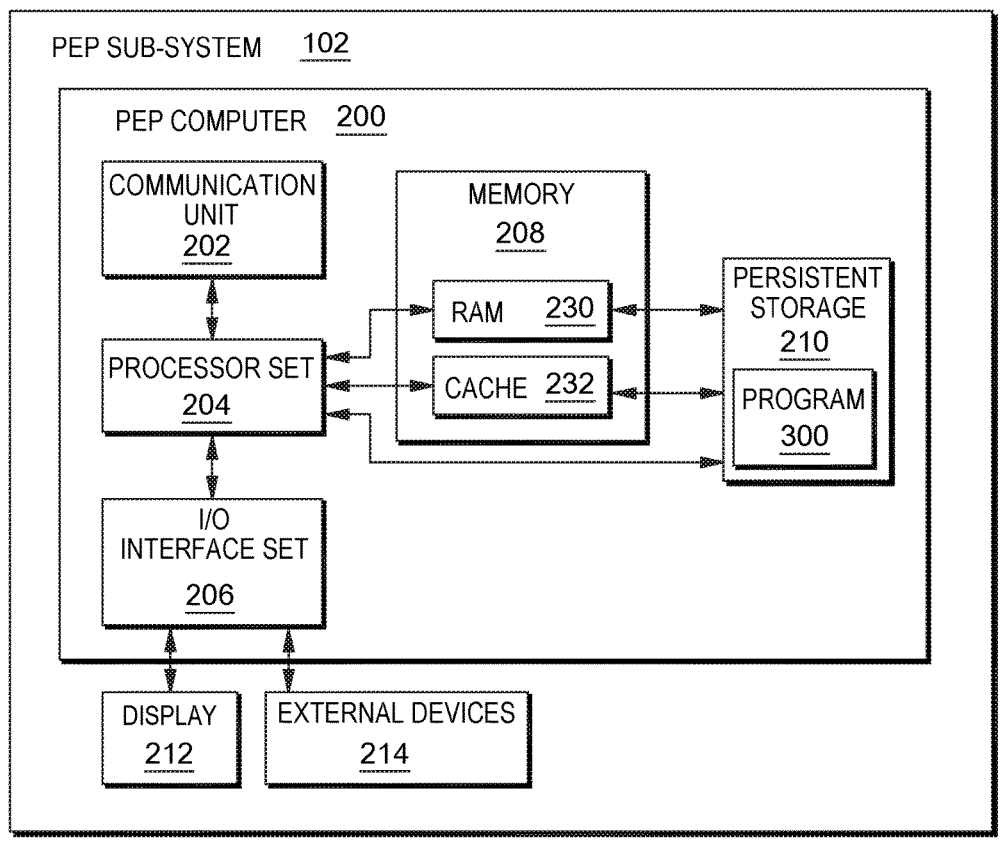
FIG. 1B is a block diagram of a policy enforcement point system according to the present invention, which is a sub-system of the first embodiment system.

An embodiment of a possible hardware and software environment for software and/or methods according to the present invention will now be described in detail with reference to the Figures. FIGS. 1A and 1B collectively make up a functional block diagram illustrating various portions of networked computers system 100, including: policy enforcement point sub-system (PEP s/s or PEP) 102; client devices 104a, b, communication network 114; cloud fraud services 120a, b, c; protected content 124a, b; application servers 126a, b; cloud 128; client browsers 150a, b; client browser code (also herein sometimes referred to as "browser script") 152a, b; PEP computer 200; communication unit 202; processor set 204; input/output (I/O) interface set 206; memory device 208; persistent storage device 210; display device 212; external device set 214; random access memory (RAM) devices 230; cache memory device 232; and program 300.

Sub-system 102 is, in many respects, representative of the various computer sub-system(s) in the present invention. Accordingly, several portions of sub-system 102 will now be discussed in the following paragraphs.

Sub-system 102 may be a laptop computer, tablet computer, netbook computer, personal computer (PC), a desktop computer, a personal digital assistant (PDA), a smart phone, or any programmable electronic device capable of communicating with the client sub-systems via network 114. Program 300 is a collection of machine readable instructions and/or data that is used to create, manage and control certain software functions that will be discussed in detail, below, in the Example Embodiment sub-section of this Detailed Description section.

Sub-system 102 is capable of communicating with other computer sub-systems via network 114. Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client sub-systems.

Sub-system 102 is shown as a block diagram with many double arrows. These double arrows (no separate reference numerals) represent a communications fabric, which provides communications between various components of sub-system 102. This communications fabric can be implemented with any architecture designed for passing data and/or control information between processors (such as microprocessors, communications and network processors, etc.), system memory, peripheral devices, and any other hardware components within a system. For example, the communications fabric can be implemented, at least in part, with one or more buses.

Memory 208 and persistent storage 210 are computer-readable storage media. In general, memory 208 can include any suitable volatile or non-volatile computer-readable storage media. It is further noted that, now and/or in the near future: (i) external device(s) 214 may be able to supply, some or all, memory for sub-system 102; and/or (ii) devices external to sub-system 102 may be able to provide memory for sub-system 102.

Program 300 is stored in persistent storage 210 for access and/or execution by one or more of the respective computer processors 204, usually through one or more memories of memory 208. Persistent storage 210: (i) is at least more persistent than a signal in transit; (ii) stores the program (including its soft logic and/or data), on a tangible medium (such as magnetic or optical domains); and (iii) is substantially less persistent than permanent storage. Alternatively, data storage may be more persistent and/or permanent than the type of storage provided by persistent storage 210.

Program 300 may include both machine readable and performable instructions and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 210 may also be removable. For example, a removable hard drive may be used for persistent storage 210. Other examples include optical and magnetic disks, thumb drives, and smart cards that are inserted into a drive for transfer onto another computer-readable storage medium that is also part of persistent storage 210.

Communications unit 202, in these examples, provides for communications with other data processing systems or devices external to sub-system 102. In these examples, communications unit 202 includes one or more network interface cards. Communications unit 202 may provide communications through the use of either or both physical and wireless communications links. Any software modules discussed herein may be downloaded to a persistent storage device (such as persistent storage device 210) through a communications unit (such as communications unit 202).

I/O interface set 206 allows for input and output of data with other devices that may be connected locally in data communication with server computer 200. For example, I/O interface set 206 provides a connection to external device set 214. External device set 214 will typically include devices such as a keyboard, keypad, a touch screen, and/or some other suitable input device. External device set 214 can also include portable computer-readable storage media such as, for example, thumb drives, portable optical or magnetic disks, and memory cards. Software and data used to practice embodiments of the present invention, for example, program 300, can be stored on such portable computer-readable storage media. In these embodiments the relevant software may (or may not) be loaded, in whole or in part, onto persistent storage device 210 via I/O interface set 206. I/O interface set 206 also connects in data communication with display device 212.

Display device 212 provides a mechanism to display data to a user and may be, for example, a computer monitor or a smart phone display screen.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

II. Example Embodiment

Figure 2:
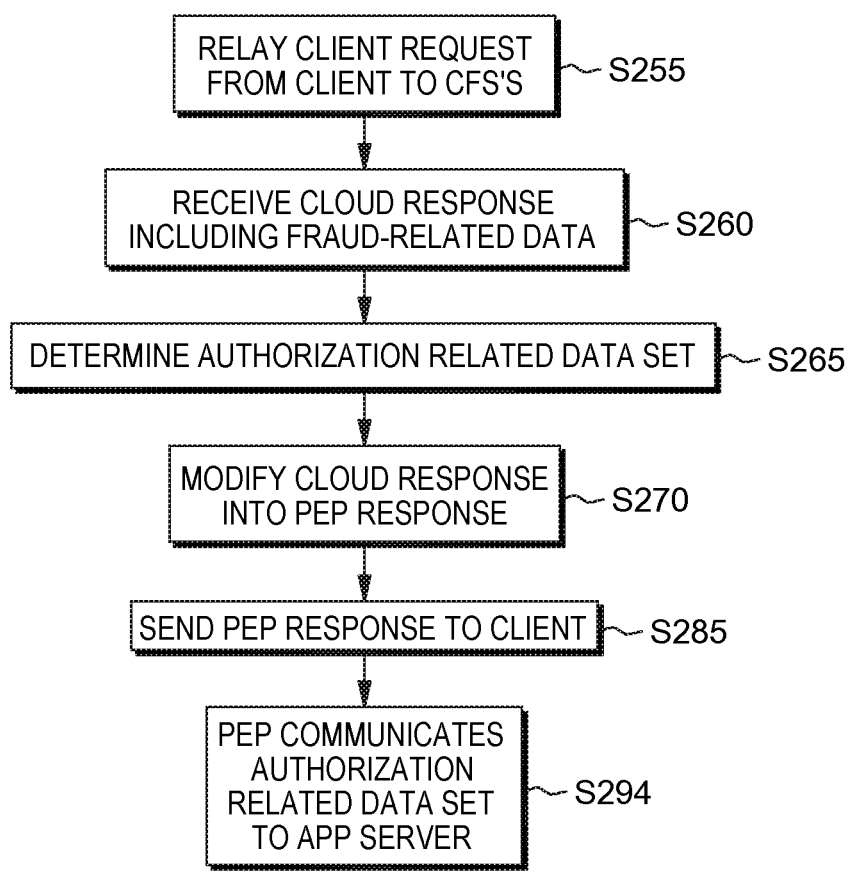
FIG. 2 is a flowchart showing a first embodiment method performed, at least in part, by the first embodiment system.
Figure 3:
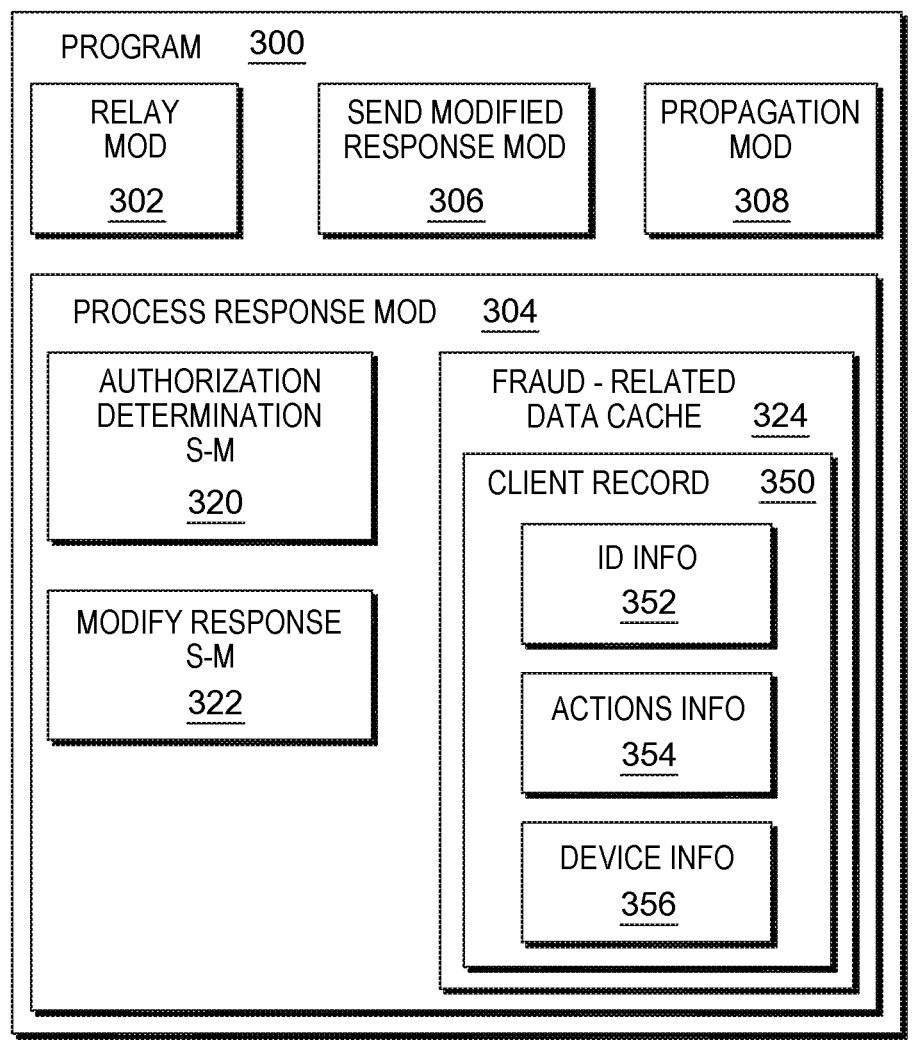
FIG. 3 is a block diagram showing a machine logic (for example, software) portion of the policy enforcement point system of FIG. 1B.

FIG. 2 shows flowchart 250 depicting a method according to the present invention. FIG. 3 shows program 300 for performing at least some of the method operations of flowchart 250. This method and associated software will now be discussed, over the course of the following paragraphs, with extensive reference to FIG. 2 (for the method operation blocks) and FIG. 3 (for the software blocks).

Processing begins at operation S255, where relay module ("mod") 302 of program 300 of PEP s/s 102 relays a request: (i) from client browser 150a of client device 104a; (ii) made through network 114; and (iii) to cloud fraud service 120b. (See FIG. 1A.) In this example, client browser 150a has made this request in parallel to an attempted authorization to application server 126b so that client device 104a can access protected content 124b. (See FIG. 1A.) Alternatively, this relayed request may come from application server 126b. As a further alternative, in some methods according to the present disclosure, PEP s/s 102 does not relay this request, but, instead, the request proceeds directly from client device 104a and/or application server 126b to cloud fraud service 120b in cloud 128 (see FIG. 1A).

With respect to the mechanism by which browser 150a of client device 104a is caused to send the request, in this embodiment, browser script 152a executes within browser 150a to detect a potential fraudulent activity occurring in real time. In response, browser script 152a is programmed to send out the request. Conventionally, these types of requests are sent directly to a cloud fraud service in the cloud designated by the browser script. In this example, browser script 152a has been modified so that the request is sent first to PEP 102, which then relays the request to CFS 120b at operation S255.

Processing proceeds to operation S260, where process response mod 304 of PEP 102 intercepts the response to the client response that is sent back from cloud fraud service (CFS) 120b and intended for client device 104a. More specifically, CFS 120b is the CFS typically used by application server 126b in evaluating user/device requests for access. CFS 120*b* includes some conventional fraud protection information (also sometimes herein referred to as "fraud related data"), and, in conventional systems, application server 126*b* would be limited to this portion of fraud related data in evaluating requests for access to protected content from various users/devices. However, as will be discussed in connection with subsequent operations of method 250, in this embodiment, PEP 102 applies greatly expanded and augmented fraud protection information in evaluating a user/device seeking authorization through a request and response thereto.

Processing proceeds to operation S265, where authorization determination sub-module ("s/m") 320 of program 300 determines an "authorization related data set." As used herein, an authorization related data set is a set of machine readable data that includes fraud related information relevant to the request sent by the client's browser code. In some embodiments, the information of the authorization related data set can allow a targeted device (such as app server 126*b*) to prevent, or stop, in real time, fraudulent transactions being made in the current communication session by client device 104*a* and its user. The fraud related information of the authorization related data set is selectively chosen by authorization determination sub-module 320 of process response module 304 of program 300 from fraud related data cache 324 of process response module 304. In this embodiment, fraud related information is maintained on a client-by-client basis (see client record 350 in FIG. 3).

In this embodiment, fraud related data cache 324 of PEP 102 is updated frequently to maintain current and comprehensive from information drawn, in part, from many sources (for example, CFS's 120*a, b, c*). Alternatively, in some embodiments, the fraud related data cache queries various machines that are connected in data communication with PEP 102 in order to obtain the fraud related information needed for authorization related data set. In this kind of embodiment, PEP 102 might, for example, responsive to intercepting a response: (i) send queries to CFS 120*a*, 120*b* and 120*c* requesting fraud related data about client device 104*a*; and (ii) store the query responses in memory (for example, a fraud related data cache) while the authorization related data set is determined by the authorization determination sub-module.

The content of fraud related information included in a given authorization related dataset will vary depending upon system design and contextual factors. For example, in some embodiments, the authorization related data set may be as simple as a recommendation of whether client device 104*a* should be allowed (for example, by app server 126*b*) to continue in its current communication session. In other embodiments, the information of the authorization related data set will be dominated by factual information about various users and various devices, but will not include any sort of recommendation for any sort of specific action.

In some embodiments, the authorization related data set may include a set of updates that PEP 102 has made to its local data store, namely fraud related data cache 324. This may be helpful to other services trying to maintain their own fraud related data stores current with that of PEP 102.

As shown in FIG. 3, fraud related data cache 324 includes a client record 350 that has data that: (i) corresponds to the user of client device 104*a*; and (ii) has been collected from previous attempts by this client to authorize transactions with various applications (for example, application server 126*a*) using various cloud fraud services (for example, CFS 120*a*, 120*b*, 120*c*). In this way, fraud related data cache 324 of program 300 of PEP 102 will tend to have more comprehensive fraud related data about the users/devices than would a single conventional CFS such as CFS 120*b* (that is, the particular, single CFS that was being consulted in this example).

In this example, client record 350 includes: (i) identification information 352 that is related to the user (or purported user) of client device 104*a*; (ii) actions information 354 that is related to communication network actions taken by client device 104*a* and/or by its user; and (iii) device information 356 relating to various devices that the user has used during previous authorization attempts to various application servers. In this example: (i) identification information 352 of client record 350 of fraud related data cache 324 indicates that a "man in the browser event" is occurring (a "man in the browser event" is a condition that is conventionally understood to be associated with fraudulent transactions associated with browser manipulation); (ii) actions information 354 indicates that device 104*a* and its user habitually makes financially-related communications, in an unencrypted manner, over publically-accessible WiFi networks; and (iii) device information 356 indicates that the user also uses another device (herein called "User's Home Computer") and that User's Home Computer was used, a year ago, in a fraudulent financial transaction. In this example, because of all the negative indications noted in this paragraph, the machine logic rules of authorization determination s/m 320 determine that device 104*a* will undergo authorization processing with respect to a transaction involving application server 126*b*.

Before moving from operation S265 to S270, it will be noted that there may be variation in the order of operations. For example, operation S265 could be performed later in method 250.

Processing proceed to operation S270 where modify response s/m 322 of process response mod 304 of program 300 of PEP 102 modifies the response, intercepted at operation S260 from CFS 120*b*, to filter fraud related authorization data from the intercepted response to obtain a modified response. The filtered fraud related authorization data: (i) is merged into the PEP's session cache; and (ii) may make up all, or at least a part of, the "authorization related data set" (see operation S265, discussed above). This fraud related authorization data is then filtered out of the response with a processing success being returned to the client. When the client device later issues a request to the application server, this cached fraud related authorization data is used to perform an authorization decision (along with user/group data) by the PEP, and this might indicate permit/deny/flag/ etc., before the request is passed to the application server (optionally) including the fraud related authorization data. The application server would then use this information to enrich its authorization processing to include fraud as well as traditional transactional information.

In this embodiment, the modified response (to be sent to the client device) indicates that authorization was "successful" (the form and format of the information indicating "success" varies with context, system software, system hardware, etc.). This response is generated as a result of authorization processing that considers the session data. The key here is that the session data is updated to indicate the status of the fraud current user/device. Data returned by the cloud may be persisted in the session data. The response to the client (sometimes herein referred to as a "modified response") is designed to avoid revealing to the fraud perpetrator (that is, the user of client device 104*a*) that the response to the request initiated by browser script 152*a* of client device 104a has resulted in anything other than success. For example, a "generic response" indicating success may be provided in the session data of the modified response that is sent back to client device 104a.

However, upon functional requests to the application server, the fraud related data of the authorization related data set (generated at operation S265) will be used, by PEP 102 and/or app server 126b, to determine authorization (for example, authorization to access protected content 124b). Optionally, these functional requests to the application server will be modified to include the session data so that the application server itself has additional information to make an independent decision. Note that there will be cases where authorization is not applied at the policy enforcement point, but rather delegated to the application server. In most cases, it is expected that the application server will have greater transactional context to make such a decision, with the support of the propagated session data. The enforcement can therefore be done by the PEP or the application server.

Processing proceeds to operation S285, where send modified response mod 306 of program 300 of PEP 102 sends the response, with its modified session data (modified at operation S270, discussed above), to browser 150a of client device 104a so that authorization will not go forward and appropriate messages can be displayed on the user interface of client device 104a. In this embodiment, the response from the cloud service (via PEP 102) will be only back to a client. The application server is downstream from the PEP, which is always inline. In this embodiment, the fraud detection response data traverses through the PEP back to the client device, and the modified response (where the fraud data is extracted) never goes to the application server. However, fraud is effectively prevented because when the client device issues a request, the PEP will use session data to authorize the request, and (when appropriate) insert fraud related data into the request to the application server.

Processing proceeds to operation S294, where the authorization related data set is sent to app server 126b. In this embodiment, app server 126b includes machine logic (not separately shown) that receives and analyzes the fraud related data in the authorization related data set to determine whether, and under what conditions, its communication session with client device 104a should continue. As mentioned above, the authorization related data set may additionally be sent to other systems, such as CFS's 120a, b, c.

III. Further Comments and/or Embodiments

Some embodiments of the present invention recognize the following facts, potential problems and/or potential areas for improvement with respect to the current state of the art: (i) in some conventional on-premises deployments, integration effort is required in order to connect existing enforcement points to fraud detection solutions; (ii) these solutions provide multiple independent (siloed) integration points to apply financial fraud intelligence to transactions, covering device trustworthiness and user account takeover; (iii) some of these approaches fail to make use of optimization that, when these capabilities are combined, can provide a more powerful fraud prevention solution at the enforcement point; and/or (iv) some conventional methods create a unique device identifier, save the identifier on the device and use the identifier in conjunction with a user access engine to influence how data is presented to the user (by way of authorization) or if a transaction should proceed, but in an internet context, this method is flawed; and/or (v) access control decision are done across different layers in a system, for example, at a gateway (for device specific information) and at an application (for user fraud information).

Some embodiments of the present invention may include one, or more, of the following features, characteristics and/or advantages: (i) avoids additional integration complexity and cost associated with solutions that require multiple enforcement points; (ii) avoids decreased performance associated with integration of a fraud solution at multiple locations; (iii) provides a single trusted point for gathering fraud data and propagating the fraud data to downstream applications; (iv) provides a single, trusted point for preventing fraud at downstream applications; (v) provides a broader solution that allows a single enforcement point to participate as an all-encompassing fraud border gateway; and (vi) eliminates inefficiencies present in the siloed solutions described in the above paragraph.

Some embodiments of the present invention may include one, or more, of the following features, characteristics and/or advantages: (i) enhancing cloud fraud services to provide fraud data securely to authenticated policy enforcement points; (ii) allowing enforcement points to query and subsequently associate (converge) fraud data with user and device context information; (iii) using this converged information to enhance gateway user/device authorization decision processing; and (iv) allowing propagation of this information so consistent policy can be applied across application tiers.

Some embodiments of the present invention may include one, or more, of the following features, characteristics and/or advantages: (i) simplifies deployment by removing multiple configuration requirements for an end to end use case; (ii) provides enhanced authorization capabilities enabled by convergence of fraud data at the gateway; (iii) ensures consistency of fraud data across an end to end deployment scenario; and/or (iv) improves performance by removing multiple application programming interface (API) calls to a fraud service.

Some embodiments of the present invention include: (i) a client device (a mobile device or web browser used by a user to access protected content); (ii) a policy enforcement point (such as a reverse proxy); (iii) a cloud fraud detection system (a system used to determine user and device fraud risk and threat); and/or (iv) a protected resource (content of value securely exposed by web or APIs).

Figure 4:
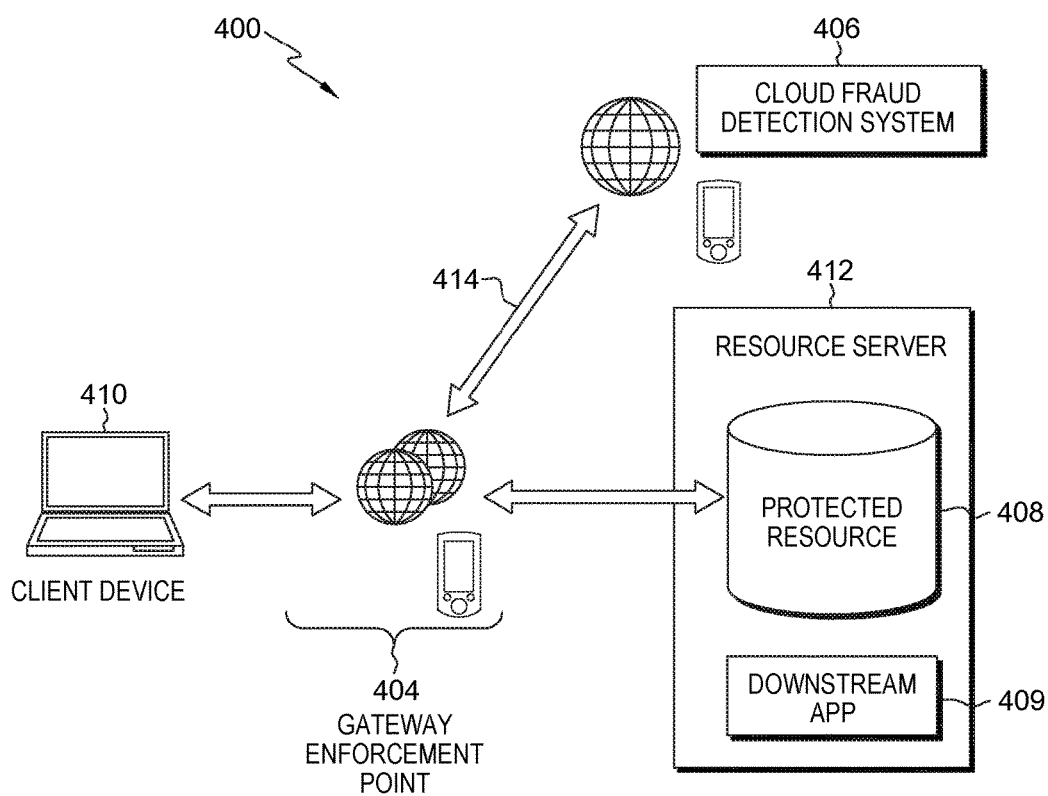
FIG. 4 is block diagram of a second embodiment of a system according to the present invention.

As shown in block diagram 400 of FIG. 4, some embodiments of the present invention include: client device 410; gateway enforcement point 404; cloud fraud detection system 406; resource server 412; protected resource 408; downstream application 409; and trusted communication path 414.

In some embodiments of the present invention, client device 410 executes browser code that results in a request to the cloud fraud service, via the policy enforcement points. In response, gateway enforcement point 404 queries cloud fraud detection system 406 for fraud data related to the client device and/or the user thereof (user not separately shown in the figures). The fraud data is associated with the user/device session and cached at the enforcement point for propagation to downstream policy enforcement points (not separately shown in the figures) for authorization.

Figure 5:
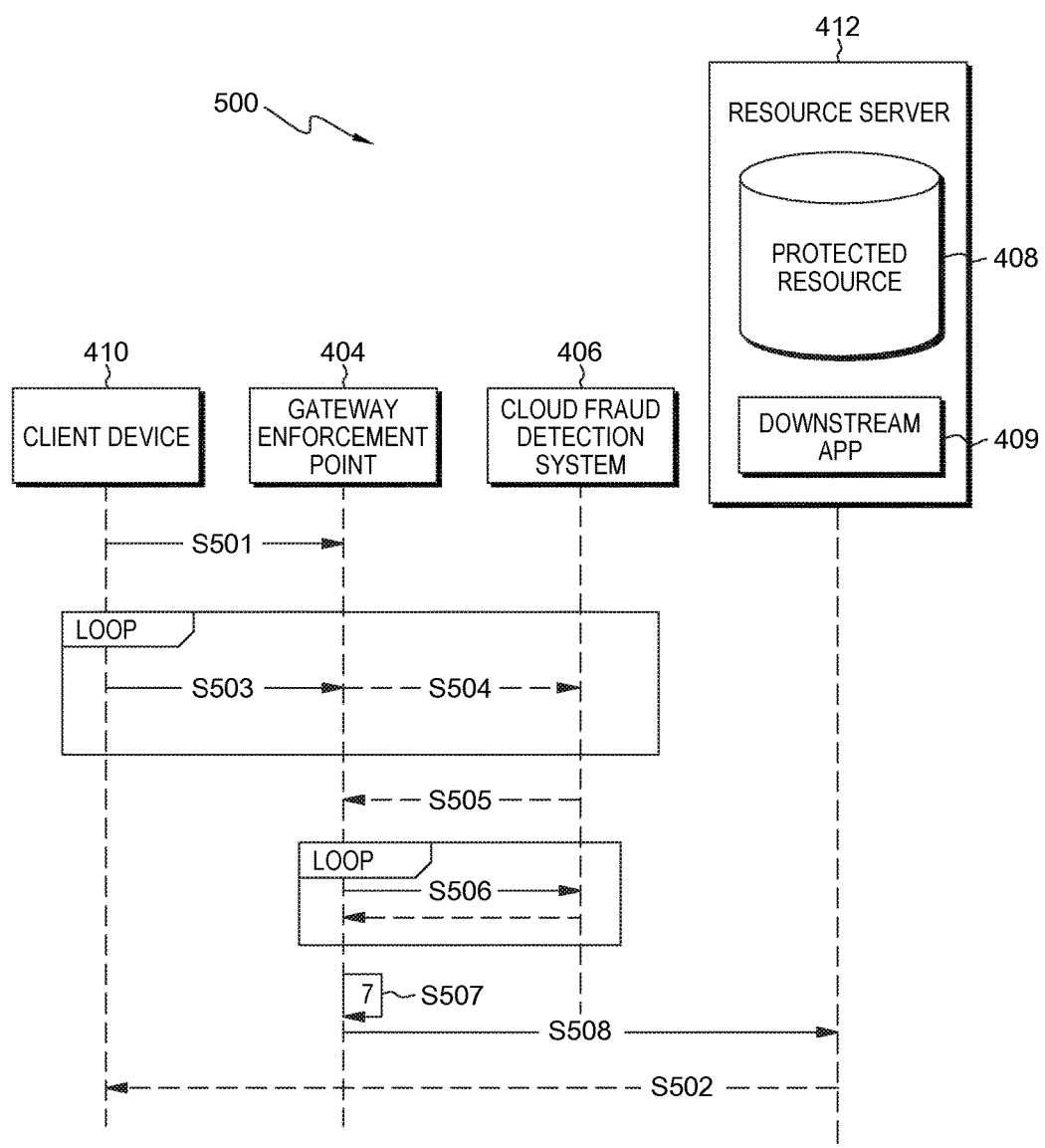
FIG. 5 is a flowchart of a second embodiment of a method performed by the second embodiment system.

A method, shown in interaction block diagram 500 of FIG. 5, will now be discussed. Processing begins at interaction S501 where client device 410 requests access to protected resource 408 and connects to gateway enforcement point 404. The client device establishes an authenticated session with the enforcement point. Client device executes browser code that results in a request to the cloud fraud service, via the policy enforcement points. The gateway enforcement point forwards the request to the resource server 412, optionally including the fraud session data cached as part of the S503/S504 interactions.

Processing begins at interaction S503 where the fraud detection payload, executed in the client device, initiates interactions with cloud fraud detection system 406, through gateway enforcement point 404.

Processing continues at interaction S504 where gateway enforcement point 404 sends a request to cloud fraud detection system 406, based on the session established with the client device. The enforcement point provides a session identifier, so that in-session fraud information updates can be gathered from cloud fraud detection system 406. The cloud fraud detection system recognizes that the request is received from a trusted gateway device (gateway enforcement point 404), and inserts additional fraud data about the user (not shown in the Figures) and client device 410 to be cached at the gateway enforcement point 404. Interactions S503 and S504 are performed in a loop, that is, once for each cloud fraud detection system (such as system 406) that has updates collected from it.

Gateway enforcement point 404 then takes the payload and augments traditional user based session data with fraud data. Gateway enforcement point 404 filters the fraud related session data from the S503 response and returns a generic successful response to the client.

Some embodiments of the present invention now continue the processing beginning with interaction S505 where cloud fraud detection system returns fraud data to be cached and associated with the user's session at gateway enforcement point 404. Cloud fraud detection system 406 links the user's session to the fraud detection results for polling in interaction S504.

Processing continues with interaction S506 where gateway enforcement point 404 uses the session identifier (optionally) to poll cloud fraud detection system 406 for updated fraud information throughout the duration of a user session. Interaction S506 is performed using a nested loop: (i) an outer loop that repeats at time intervals; and (ii) an inner loop that polls the various cloud fraud detection systems (system 406 and other systems not shown in FIG. 5). The fraud data is also always returned from the cloud to the gateway enforcement point, and is never returned to the client. The PEP only downstreams fraud data to the application so that it (optionally) can take action. The source of fraud data is from the Client to the CFS (through the gateway enforcement point) of from the CFS to the PEP (per the looping S506 mechanism).

Processing continues with interaction S507 where gateway enforcement point 404 makes context authorization decisions using fraud information. Alternatively, a policy decision point (not shown in the Figures) makes these context decisions on behalf of the enforcement point.

Processing continues with interaction S508 where context decisions determine the next appropriate action. Example context decisions include: (i) permit access; (ii) notify resource owner of at-risk users; and/or (iii) perform auditing (logging of accesses to a protected system and protected resources) and remediation. In the case that the request from S501 is permitted, the request is passed to the application server, optionally including the cached fraud data.

Processing continues at interaction S502 where resource server 412 returns protected resource 408 (the requested payload).

Some embodiments of the present invention may include one, or more, of the following features, characteristics and/or advantages: (i) takes advantage of the trusted path aspect of a network device (for example, a security access manager appliance) to a public cloud fraud service, by providing fraud related intelligence data on this trusted path, which can be used in downstream applications to enforce a security policy; (ii) enhances the value of a conventional security solution; and/or (iii) consolidates multiple integration points of a conventional cloud fraud service into a consolidated gateway authorization solution.

Some embodiments of the present invention consolidate fraud and user access management to give security policy teams the ability to converge into a single security policy at a gateway device. It does this by using an association of user session data with characteristics (for example, a malware infection) of the associated client device so that a converged (that is, a consistent) security policy can be applied throughout a deployed web (or cloud based) solution.

Some embodiments of the present invention focus on convergence of user access management and fraud detection, but providing a converged view of a client connected device and user for authorization purposes. Embodiments of the present invention focus on an ability to converge fraud (on the endpoint), and user data, to make better informed authorization decisions for current web based access.

Some embodiments of the present invention converge disparate enforcement points across an n-tier architecture. With the emergence of "cloud fraud data," the convergence results in a solution where an on-premise device can consolidate fraud data so that it can be easily converged with other authorization services (such as user access management). Some embodiments of the present invention further eliminate the need for expensive programmatic integration, thus being a lower cost alternative to conventional deployment models.

Some embodiments of the present invention embody: (i) a specific fraud solution that allows a trusted border gateway device to store device specific malware detection data (retrieved from a fraud cloud service) within the gateway device; (ii) providing this data back to such a gateway service; (iii) making user access and device fraud decisions easier, as the information is bound together at the gateway; and/or (iv) provision of a mechanism for binding the information together at the gateway.

Some embodiments of the present invention propagate user and device fraud data to hosted applications by: (i) enhancing cloud fraud services to provide fraud data securely to authenticated policy enforcement points; (ii) allowing enforcement points to query and subsequently associate fraud data with user and device context information; (iii) using this converged information to enhance gateway user/device authorization decision processing; and/or (iv) allowing propagation of this information such that consistent policy can be applied across application tiers.

In some embodiments of the present invention, the channel available between a gateway and a service is trusted, enabling the solution to consume, filter, and cache for propagation, a broad set of data about a user and the user's devices.

The following example use case illustrates operation of one embodiment of the present invention: (i) a user logs in to a service using device A, where device A is determined to bear some fraudware, or has been involved in actions having security implications; (ii); the system links the user's identity with the fraudware and/or past actions that have had security implications; and (iii) the service takes appropriate security action(s) based on relevant information available concerning the user, devices A and B, and/or past user actions having had security implications. Action taken at this point should not allow an attacker on the client device to detect a change in behavior. Hence, an example of an appropriate response would be to allow a user to login, but to reduce the set of permissible actions taken for the session. This might even include delaying transaction processing while informing the device of success.

Further to the example illustrated above: (i) the gateway understands the state of device B; and (ii) subsequently issues an application API call that queries the user's historical compromised state (for example, compromised because of device A). Hence, the decision to block logging in is made at the application, subsequent to the current device check.

Some embodiments of the present invention may include one, or more, of the following features, characteristics and/or advantages: (i) the gateway becomes a trusted client to the service; (ii) the gateway accommodates (collects and makes use of) service fraud data that otherwise would not be available.

Some embodiments of the present invention, converge client fraud data (from the service) with fraud data associated with the user (from the gateway) into a set of claims that can more accurately determine user/device authorization (in a gateway). Further, with the gateway integrated with the service, the trusted (inline) channel is used to propagate data back to the gateway so that the data can be used for downstream applications.

Some embodiments of the present invention may include one, or more, of the following features, characteristics and/or advantages: (i) converges a user's session with fraud analysis (for example, financial fraud) results of a device (performed as part of a "service") so that authorization policies may be applied at a gateway independent of an application tier and independent of the device (fraud in this context is internet-originated fraud that may only be detected as part of a global intelligence effort, and hence the fraud decision engine resides in a "cloud"); (ii) relies on the cloud to determine, on a case by case basis, the trustworthiness of a device being presented; (iii) extends conventional user-based authorization solutions to include detection of fraud within the context of a user's requested operation; (iv) converges device malware presence with user authorization and victim identification (to help detect whether the user been subjected to a successful attack in the past) at a gateway, to provide a single "choke-point" for making access control decisions; and/or (v) convergence of device specific information and user specific information at a gateway provides a trusted channel to downstream device fraud metadata and user related fraud metadata to the application.

Some embodiments of the present invention may include one, or more, of the following features, characteristics and/or advantages: (i) enhances cloud fraud services to provide fraud data securely to authenticated policy enforcement points (PEP); (ii) allows enforcement points to query and subsequently associate fraud data with user and device context information; (iii) uses this converged information to enhance gateway user/device authorization decision processing; (iv) allows propagation of this information so that consistent policy can be applied across application tiers; (v) by implementation of this convergence, the trusted response channel created between the PEP and the cloud is used to exchange additional information that can be associated with the current user/device session; (vi) once this information is in the active session (in the PEP), propagates the information to application servers that are hosted in-line with the PEP; and/or (vii) greatly simplifies an integrated solution where user access and fraud detection are implemented.

IV. Definitions

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

Including/include/includes: unless otherwise explicitly noted, means "including but not necessarily limited to."

User/subscriber: includes, but is not necessarily limited to, the following: (i) a single individual human; (ii) an artificial intelligence entity with sufficient intelligence to act as a user or subscriber; and/or (iii) a group of related users or subscribers.

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

Browser script: any code in a browser that effects a request for browser interrogation, regardless of whether the code was added to a pre-existing browser, or, written into the browser when the browser was originally written, or added to the response by a website, and also regardless to whether the browser script appears in contiguous fashion in the larger code of the browser.

Authorization processing: any processing used to determine whether a client device is authorized to engage in a transaction performed through a communication network; in some embodiments, the result of a successful authorization decision may be to allow, flag or deny; in the case of flag operation, a fraudulent transaction may have been detected, and halted, but the response to the client device indicates successful completion.

What is claimed is:

1. A method comprising:
receiving, by a gateway enforcement point, through a communication network from a client device used by a user, a first request to access a protected resource;
responsive to receipt of the first request, authenticating, by the gateway enforcement point, the client device to establish a first authenticated communication session between the gateway enforcement point and the client device, with authenticating the client device including receiving, by the gateway enforcement point, authentication data relating to the user;

further responsive to receipt of the first request to access the protected resource, sending, by the gateway enforcement point to a first cloud fraud detection system, a second request for fraud information relating to the user, with the second request including: (i) the authentication data, and (ii) a session identifier identifying the first authenticated communication session;

receiving, by the gateway enforcement point from the first cloud fraud detection system, a first fraud data set indicative of fraud related information relating to the user;

caching, in the gateway enforcement point as part of the first authenticated communication session, the first fraud data set;

further responsive to receipt of the first request to access the protected resource, sending, by the gateway enforcement point to a second cloud fraud detection system, a third request for fraud information relating to the user, with the third request including: (i) the authentication data, and (ii) the session identifier;

receiving, by the gateway enforcement point from the second cloud fraud detection system, a second fraud data set indicative of fraud related information relating to the user;

caching, in the gateway enforcement point as part of the first authenticated communication session, the second fraud data set; and controlling, by the gateway enforcement point, access to the protected resource by the client device in a manner based upon both of the following: (i) the fraud related information of the first fraud data set, and (ii) the fraud related information of the second fraud data set.

2. The method of claim 1 wherein controlling access includes denying, by the gateway enforcement point, access to the client device of the protected resource based on at least one of the following: (i) the fraud related information of the first fraud data set, and (ii) the fraud related information of the second fraud data set.

3. The method of claim 1 wherein controlling access includes propagating, by the gateway enforcement point to a resource server hosting the protected resource: (i) the fraud related information of the first fraud data set, and (ii) the fraud related information of the second fraud data set.

4. A computer program product comprising:
a machine readable storage device; and
computer code stored on the machine readable storage device, with the computer code including instructions for causing a processor(s) set to perform operations including the following:
  receiving, by a gateway enforcement point, through a communication network from a client device used by a user, a first request to access a protected resource,
  responsive to receipt of the first request, authenticating, by the gateway enforcement point, the client device to establish a first authenticated communication session between the gateway enforcement point and the client device, with authenticating the client device including receiving, by the gateway enforcement point, authentication data relating to the user,
  further responsive to receipt of the first request to access the protected resource, sending, by the gateway enforcement point to a first cloud fraud detection system, a second request for fraud information relating to the user, with the second request including: (i) the authentication data, and (ii) a session identifier identifying the first authenticated communication session,
  receiving, by the gateway enforcement point from the first cloud fraud detection system, a first fraud data set indicative of fraud related information relating to the user,
  caching, in the gateway enforcement point as part of the first authenticated communication session, the first fraud data set,
  further responsive to receipt of the first request to access the protected resource, sending, by the gateway enforcement point to a second cloud fraud detection system, a third request for fraud information relating to the user, with the third request including: (i) the authentication data, and (ii) the session identifier,
  receiving, by the gateway enforcement point from the second cloud fraud detection system, a second fraud data set indicative of fraud related information relating to the user,
  caching, in the gateway enforcement point as part of the first authenticated communication session, the second fraud data set, and
  controlling, by the gateway enforcement point, access to the protected resource by the client device in a manner based upon both of the following: (i) the fraud related information of the first fraud data set, and (ii) the fraud related information of the second fraud data set.

5. The computer program product of claim 4 wherein controlling access includes denying, by the gateway enforcement point, access to the client device of the protected resource based on at least one of the following: (i) the fraud related information of the first fraud data set, and (ii) the fraud related information of the second fraud data set.

6. The computer program product of claim 4 wherein controlling access includes propagating, by the gateway enforcement point to a resource server hosting the protected resource: (i) the fraud related information of the first fraud data, and (ii) the fraud related information of the second fraud data set.

7. A computer system comprising:
a processor(s) set;
a machine readable storage device; and
computer code stored on the machine readable storage device, with the computer code including instructions for causing the processor(s) set to perform operations including the following:
  receiving, by a gateway enforcement point, through a communication network from a client device used by a user, a first request to access a protected resource,
  responsive to receipt of the first request, authenticating, by the gateway enforcement point, the client device to establish a first authenticated communication session between the gateway enforcement point and the client device, with the authenticating the client device including receiving, by the gateway enforcement point, authentication data relating to the user,
  further responsive to receipt of the first request to access the protected resource, sending, by the gateway enforcement point to a first cloud fraud detection system, a second request for fraud information relating to the user, with the second request including: (i) the authentication data, and (ii) a session identifier identifying the first authenticated communication session, receiving, by the gateway enforcement point from the first cloud fraud detection system, a first fraud data set indicative of fraud related information relating to the user, caching, in the gateway enforcement point as part of the first authenticated communication session, the first fraud data set, further responsive to receipt of the first request to access the protected resource, sending, by the gateway enforcement point to a second cloud fraud detection system, a third request for fraud information relating to the user, with the third request including: (i) the authentication data, and (ii) the session identifier, receiving, by the gateway enforcement point from the second cloud fraud detection system, a second fraud data set indicative of fraud related information relating to the user, caching, in the gateway enforcement point as part of the first authenticated communication session, the second fraud data set, and controlling, by the gateway enforcement point, access to the protected resource by the client device in a manner based upon both of the following: (i) the fraud related information of the first fraud data set, and (ii) the fraud related information of the second fraud data set.

8. The computer system of claim 7 wherein controlling access includes denying, by the gateway enforcement point, access to the client device of the protected resource based on at least one of the following: (i) the fraud related information of the first fraud data set, and (ii) the fraud related information of the second fraud data set.

9. The computer system of claim 7 wherein controlling access includes propagating, by the gateway enforcement point and to a resource server hosting the protected resource: (i) the fraud related information of the first fraud data set, and (ii) the fraud related information of the second fraud data set.

* * * * *